US009607163B2

(12) United States Patent
Hagiuda et al.

(10) Patent No.: US 9,607,163 B2
(45) Date of Patent: Mar. 28, 2017

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventors: Tadashi Hagiuda, Yokohama (JP); Motonori Ueki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 291 days.

(21) Appl. No.: 14/548,831

(22) Filed: Nov. 20, 2014

(65) Prior Publication Data

US 2015/0169879 A1    Jun. 18, 2015

(30) Foreign Application Priority Data

Dec. 17, 2013  (JP) ................................ 2013-260665
Apr. 17, 2014  (JP) ................................ 2014-085887

(51) Int. Cl.
G06F 21/60    (2013.01)
G06F 17/30    (2006.01)
G06F 11/36    (2006.01)
H04L 29/06    (2006.01)

(52) U.S. Cl.
CPC .......... *G06F 21/604* (2013.01); *G06F 11/368* (2013.01); *G06F 17/3023* (2013.01); *G06F 17/30309* (2013.01); *G06F 17/30356* (2013.01); *H04L 63/20* (2013.01)

(58) Field of Classification Search
CPC .. G06F 21/604; G06F 17/3023; G06F 11/368; G06F 17/30309; H04L 63/20
See application file for complete search history.

(56) References Cited

U.S. PATENT DOCUMENTS 5,438,661 A * 8/1995 Ogawa ...................... G06F 8/71
                                                              715/259
5,920,873 A * 7/1999 Van Huben ............ G06Q 10/04
2001/0023486 A1* 9/2001 Kayashima ........... G06F 21/604
                                                              726/6

(Continued)

FOREIGN PATENT DOCUMENTS

JP          2007-185814 A      7/2007

*Primary Examiner* — Robert Leung
*Assistant Examiner* — Thomas Ho
(74) *Attorney, Agent, or Firm* — Carter, DeLuca, Farrell & Schmidt, LLP

(57) ABSTRACT

An information processing apparatus determines, in response to acceptance of an edit of a file including a plurality of setting items, whether or not the information processing apparatus supports a version corresponding to the plurality of setting items included in the file. In the case of determining that the information processing apparatus supports the version, the information processing apparatus displays an edit screen of the file on a display unit of the information processing apparatus. In the case of determining that the information processing apparatus does not support the version, the information processing apparatus displays the edit screen of the file on the display unit of the information processing apparatus, using edit screen data for a display process by a network device that supports the version.

15 Claims, 14 Drawing Sheets

(56) References Cited

U.S. PATENT DOCUMENTS

| | | | |
|---|---|---|---|
| 2003/0065942 A1* | 4/2003 | Lineman | G06F 21/577 |
| | | | 726/4 |
| 2003/0208490 A1* | 11/2003 | Larrea | G06F 17/3056 |
| 2003/0220939 A1* | 11/2003 | Nagao | G06F 17/24 |
| 2009/0225362 A1* | 9/2009 | Akiyama | G06F 3/1204 |
| | | | 358/1.15 |
| 2010/0202450 A1* | 8/2010 | Ansari | G06Q 30/04 |
| | | | 370/389 |

* cited by examiner

F I G. 1
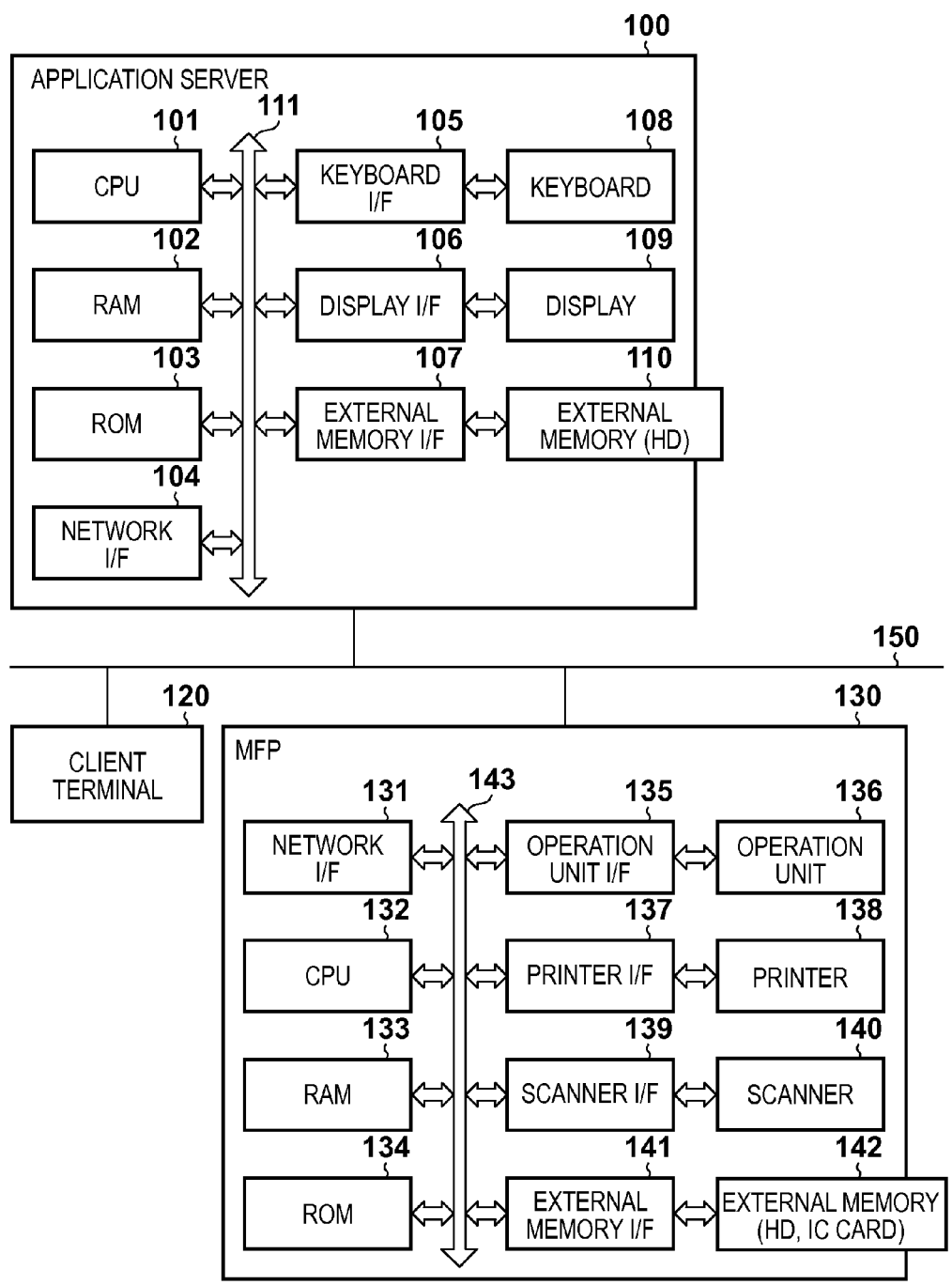

FIG. 3A

| APPLICATION SERVER IDENTIFIER | COMPUTER NAME | SYSTEM NAME | IP ADDRESS | ADMINISTRATOR | SPVer |
|---|---|---|---|---|---|
| 1 | XYZServer | MC3.2 | 192.168.xxx.xxx | TANAKA | 2.0.0 |

FIG. 3B

| NETWORK DEVICE IDENTIFIER | DEVICE NAME | PRODUCT NAME | IP ADDRESS | SERIAL NUMBER | INSTALLATION LOCATION | ADMINISTRATOR | SPVer | SP EDIT FUNCTION |
|---|---|---|---|---|---|---|---|---|
| 1 | MFP A | Model A | 192.168.xxx.xxx | xx:xx:xx:xx:xx:xx | FREE ADDRESS | TANAKA | 1.0.0 | TRUE |
| 2 | MFP B | Model a | 192.168.xxx.xxx | xx:xx:xx:xx:xx:xx | Room11 | YAMADA | 1.0.0 | FALSE |
| 3 | MFP C | Model b | 192.168.xxx.xxx | xx:xx:xx:xx:xx:xx | Room22 | KANEKO | 1.0.0 | FALSE |
| 4 | MFP D | Model B | 192.168.xxx.xxx | xx:xx:xx:xx:xx:xx | Room33 | NAKAYAMA | 2.0.0 | TRUE |
| 5 | MFP E | Model C | 192.168.xxx.xxx | xx:xx:xx:xx:xx:xx | Room44 | MURAKAMI | 3.0.0 | TRUE |
| 6 | MFP F | Model C | 192.168.xxx.xxx | xx:xx:xx:xx:xx:xx | Room22 | KANEKO | 3.0.0 | TRUE |

FIG. 3C

| SP IDENTIFIER | SP NAME | SPVer | SP SETTING IDENTIFIER | LAST UPDATE DATE AND TIME |
|---|---|---|---|---|
| 1 | SECURITY POLICY FOR BUILDING A | 1.0.0 | 1 | 2013/03/24 00:00:00 |
| 2 | SECURITY POLICY FOR BUILDING B | 1.0.0 | 2 | 2013/05/05 00:00:00 |
| 3 | SECURITY POLICY FOR 1F TO 5F OF BUILDING C | 1.0.0 | 3 | 2013/04/06 00:00:00 |
| 4 | SECURITY POLICY FOR 6F TO 8F OF BUILDING C | 2.0.0 | 1 | 2013/06/28 00:00:00 |
| 5 | SECURITY POLICY FOR BUILDING D | 3.0.0 | 1 | 2013/08/15 00:00:00 |

| SP SETTING IDENTIFIER | GUEST ACCOUNT PROHIBITION | PASSWORD CACHE PROHIBITION | INITIAL PASSWORD CHANGE ENFORCEMENT | PLAINTEXT AUTHENTICATION PROHIBITION | SNMPv1 PROHIBITION | AUDIT LOG ENFORCEMENT | SPVer |
|---|---|---|---|---|---|---|---|
| 1 | FALSE | FALSE | FALSE | FALSE | FALSE | FALSE | 1.0.0 |
| 2 | TRUE | FALSE | FALSE | FALSE | TRUE | FALSE | 1.0.1 |
| 3 | TRUE | TRUE | TRUE | TRUE | TRUE | TRUE | 1.0.0 |
| 410 | 411 | 412 | 413 | 414 | 415 | 416 | 417 |

| SP SETTING IDENTIFIER | GUEST ACCOUNT PROHIBITION | PASSWORD CACHE PROHIBITION | INITIAL PASSWORD CHANGE ENFORCEMENT | PLAINTEXT AUTHENTICATION PROHIBITION | SNMPv1 PROHIBITION | AUDIT LOG ENFORCEMENT | PASSWORD TIME LIMIT (DAYS) | PASSWORD COMPLEXITY | SPVer |
|---|---|---|---|---|---|---|---|---|---|
| 1 | TRUE | TRUE | TRUE | FALSE | TRUE | FALSE | 30 | Mid | 2.0.0 |
| 420 | 421 | 422 | 423 | 424 | 425 | 426 | 427 | 428 | 429 |

| SP SETTING IDENTIFIER | GUEST ACCOUNT PROHIBITION | PASSWORD CACHE PROHIBITION | INITIAL PASSWORD CHANGE ENFORCEMENT | PLAINTEXT AUTHENTICATION PROHIBITION | SNMPv1 PROHIBITION | AUDIT LOG ENFORCEMENT | PASSWORD TIME LIMIT (DAYS) | PASSWORD COMPLEXITY | FIREWALL ENFORCEMENT | SNTP ENFORCEMENT | WEAK ENCRYPTION PROHIBITION | SPVer |
|---|---|---|---|---|---|---|---|---|---|---|---|---|
| 1 | TRUE | TRUE | TRUE | TRUE | TRUE | TRUE | 20 | High | TRUE | TRUE | FALSE | 3.0.0 |
| 430 | 431 | 432 | 433 | 434 | 435 | 436 | 437 | 438 | 439 | 440 | 441 | 442 |

| TASK IDENTIFIER | TASK NAME | EXECUTION DATE AND TIME | TASK STATE | NETWORK DEVICE IDENTIFIER | SPVer | SP IDENTIFIER |
|---|---|---|---|---|---|---|
| 1 | SP DELIVERY TASK1 | 2013/06/01 00:00 | ALREADY EXECUTED | 1,2,3 | 1.0.0 | 1 |
| 2 | SP DELIVERY TASK2 | 2013/07/01 00:00 | CURRENTLY EXECUTED | 1,2,3 | 1.0.0 | 2 |
| 3 | SP DELIVERY TASK3 | 2013/08/01 00:00 | STANDBY | 1,2,3 | 1.0.0 | 1 |
| 4 | SP DELIVERY TASK4 | 2013/09/01 00:00 | STANDBY | 1,2,3 | 2.0.0 | 1 |
| 440 | 441 | 442 | 443 | 444 | 445 | 446 |

FIG. 6A

SECURITY POLICY LIST

TO EDIT SECURITY POLICY, SELECT SECURITY POLICY AND CLICK "EDIT" BUTTON

602 — EDIT

| NAME | VERSION | LAST UPDATE DATE AND TIME |
|---|---|---|
| SECURITY POLICY FOR BUILDING D | 3.0.0 | 2013/08/15 13:26:14 |
| SECURITY POLICY FOR 6F TO 8F OF BUILDING C | 2.0.0 | 2013/06/28 10:10:17 |
| SECURITY POLICY FOR BUILDING B | 1.0.1 | 2013/05/05 09:11:23 |
| SECURITY POLICY FOR BUILDING C | 1.0.0 | 2013/04/06 15:44:19 |
| SECURITY POLICY FOR BUILDING A | 1.0.0 | 2013/03/24 14:33:28 |

SECURITY POLICY EDIT DEVICE LIST

THE FOLLOWING IS THE LIST OF DEVICES CAPABLE OF EDITING SECURITY POLICY

613 — RETURN   614 — CANCEL   612 — SELECT

| DEVICE NAME | PRODUCT NAME | VERSION | IP ADDRESS |
|---|---|---|---|
| MFP A | Canon MFP 5000 | 3.0.0 | xxx.xxx.xxx.xxx |
| MFP B | Canon MFP 5000 | 2.0.0 | xxx.xxx.xxx.xxx |
| MFP C | Canon MFP 4500 | 1.0.1 | xxx.xxx.xxx.xxx |
| SPM | Security Policy Management Server | 1.0.0 | xxx.xxx.xxx.xxx |

611

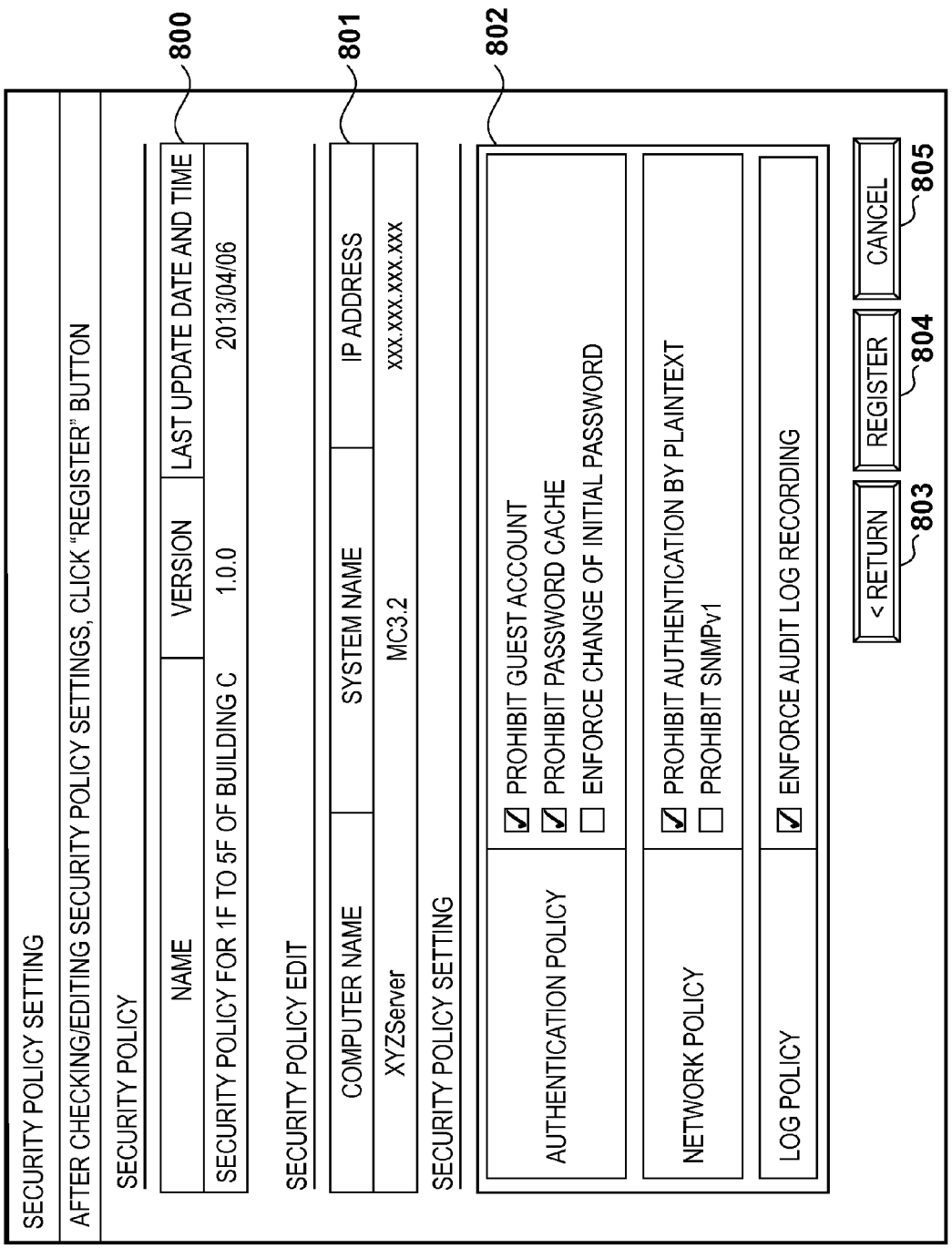

FIG. 9

| SECURITY POLICY SETTING |
|---|
| AFTER CHECKING/EDITING SECURITY POLICY SETTINGS, CLICK "REGISTER" BUTTON |

SECURITY POLICY

| NAME | VERSION | LAST UPDATE DATE AND TIME |
|---|---|---|
| SECURITY POLICY FOR BUILDING D | 3.0.0 | 2013/08/15 |

~900

SECURITY POLICY EDIT

| DEVICE NAME | PRODUCT NAME | IP ADDRESS |
|---|---|---|
| MFP E | Model C | xxx.xxx.xxx.xxx |

SECURITY POLICY SETTING ~901

| | |
|---|---|
| AUTHENTICATION POLICY | ☑ PROHIBIT GUEST ACCOUNT<br>☑ PROHIBIT PASSWORD CACHE<br>☐ ENFORCE CHANGE OF INITIAL PASSWORD<br>☐ ENABLE LOGIN TIME LIMIT<br>☐ REQUEST PASSWORD COMPLEXITY |
| NETWORK POLICY | ☑ PROHIBIT AUTHENTICATION BY PLAINTEXT<br>☐ PROHIBIT SNMPv1<br>☐ ENFORCE FIREWALL<br>☑ ENFORCE SNTP SETTING |
| ENCRYPTION/ CERTIFICATE POLICY | ☑ PROHIBIT USE OF WEAK ENCRYPTION |
| LOG POLICY | ☑ ENFORCE AUDIT LOG RECORDING |

~902

[< RETURN] [REGISTER] [CANCEL]
~903      ~904      ~905

INFORMATION PROCESSING APPARATUS, CONTROL METHOD, AND STORAGE MEDIUM STORING PROGRAM

BACKGROUND OF THE INVENTION

Field of the Invention

The present invention relates to an information processing apparatus, a control method, and a storage medium storing a program for managing security information.

Description of the Related Art

In recent years, an increasing number of companies have introduced security policies to enhance the network security in offices. Japanese Patent Laid-Open No. 2007-185814 describes a technique of setting the values of security function setting items corresponding to a security level designated by a user.

In the case where a network device management apparatus manages security policies of network devices, typically the network device management apparatus edits the security policies and, having checked the settings of the security policies, delivers the security policies to the network devices managed by the network device management apparatus.

However, in the case where setting information is changed in a predetermined network device as a result of security policy reexamination or the like, for example, the network device management apparatus may not support the version of the security policy with the changed setting information at the time of the change. In such a case, the network device management apparatus may be unable to edit the security policy because the changed (for example, extended) setting items are not managed in the network device management apparatus.

SUMMARY OF THE INVENTION

The present invention provides an information processing apparatus, a control method, and a storage medium storing a program for appropriately displaying an edit screen of setting information corresponding to a version to be edited.

The present invention in one aspect provides an information processing apparatus capable of communicating with a network device, the information processing apparatus comprising: an acceptance unit configured to accept an edit of a file including a plurality of setting items; a determination unit configured to determine whether or not the information processing apparatus supports a version corresponding to the plurality of setting items included in the file, in response to the acceptance of the edit by the acceptance unit; and a display control unit configured to: in a case where the determination unit determines that the information processing apparatus supports the version corresponding to the plurality of setting items included in the file, display an edit screen of the file on a display unit of the information processing apparatus; and in a case where the determination unit determines that the information processing apparatus does not support the version corresponding to the plurality of setting items included in the file, display the edit screen of the file on the display unit of the information processing apparatus, using edit screen data for a display process by a network device that supports the version.

According to the present invention, an edit screen of setting information corresponding to a version to be edited can be displayed appropriately.

Further features of the present invention will become apparent from the following description of exemplary embodiments with reference to the attached drawings.

BRIEF DESCRIPTION OF THE DRAWINGS

FIG. 1 is a diagram showing the structure of a network device management system.

FIGS. 3A to 3C are diagrams each showing a table for managing setting information.

FIGS. 4A to 4D are diagrams each showing a table for managing setting information.

FIGS. 6A and 6B are diagrams each showing an example of a selection screen.

FIG. 8 is a diagram showing an example of a security policy setting screen.

FIG. 9 is a diagram showing an example of a security policy setting screen.

DESCRIPTION OF THE EMBODIMENTS

Figure 2:
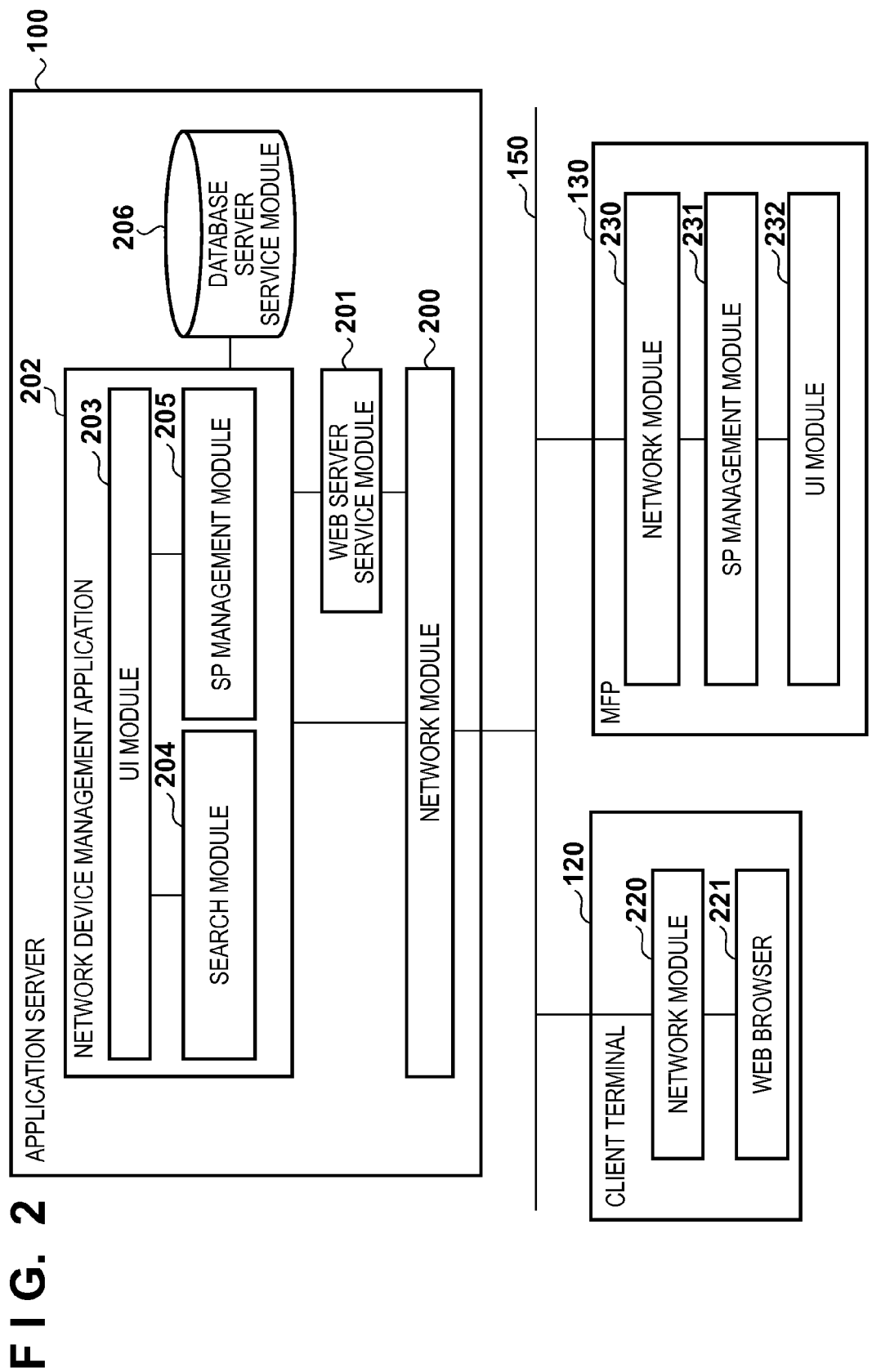
FIG. 2 is a diagram showing the software structure of the network device management system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same structural elements are given the same reference signs, and their description is omitted.

FIG. 1 is a diagram showing the structure of a network device management system in an embodiment of the present invention. As shown in FIG. 1, a system 1 includes an application server 100, a client terminal 120, and an MFP 130. The application server 100, the client terminal 120, and the MFP 130 are connected via a network 150 so as to communicate with each other. The network 150 may be a wired network such as a LAN, or a wireless network enabling wireless communication. The application server 100 manages each apparatus connected to the network 150. As an example of the management, the application server 100 edits security-related setting information applicable to each apparatus connected to the network 150, and delivers the edited setting information to the apparatus subjected to the setting. Hereafter, each apparatus connected to the network 150 is also collectively referred to as "network device".

The security-related setting information is typical setting information intended for protection of user information and the like, which is usable in the system 1. For example, the security-related setting information is setting information about whether or not to perform user authentication, login time limit, and the like. The security-related setting information applicable to each network device in the system 1 varies widely. In this embodiment, the security-related setting information is categorized according to the version of firmware implemented in the network device. For instance, in the case where the version of firmware is Ver1.00, setting information for the category "user authentication and password setting" including guest account prohibition, login time limit, and the like can be set. In the case where the version of firmware is Ver1.10, setting information for not only the category "user authentication and password setting" but also the network category including firewall setting can be set. In this embodiment, the category (or categories) that can be set is associated with the firmware version of the network device, and such association is referred to as "security policy (SP)".

The MFP 130 is a multifunctional peripheral that combines multiple functions such as a scan function, a fax function, and a print function into one. In the system 1, the application server 100 can edit security policy setting information corresponding to a firmware version designated by a user, and deliver (transmit) the edited setting information to a delivery destination (transmission destination) network device. In FIG. 1, the MFP 130 is shown as a network device. The MFP 130 can receive the edited security policy setting information from the application server 100, and set the security policy setting information in the MFP 130. Though the client terminal 120 and the MFP 130 are shown as network devices in FIG. 1, a single-function apparatus such as a printer or a fax machine may further be connected to the network 150 as a network device.

The client terminal 120 can access the application server 100 and request an application service, through an HTTP request or the like. For example, the application server 100 and the client terminal 120 are each a general-purpose PC (information processing apparatus). The following describes the hardware structure of the application server 100. The description of the application server 100 also applies to the client terminal 120, and so the description of the client terminal 120 is omitted.

A CPU 101 executes an application program (hereafter "application") stored in, for example, a ROM 103 or an external memory 110 such as a hard disk (HDD), to control the overall application server 100. The CPU 101 also displays a user interface screen such as an edit screen on a display 109 (display unit). In this embodiment, the CPU 101 can display an edit screen of security policy setting information on the display 109. The user can input each instruction such as registration of edited information, through a keyboard 108, a cursor operation on the edit screen, and the like.

A RAM 102 is used as a main memory, a work area, and the like by the CPU 101. The ROM 103 is a read-only memory used as a storage area for a basic I/O program and the like. An operating system (OS), various files and data used for application processes, a control program for realizing the operations in this embodiment, and the like are stored in the ROM 103 or the external memory 110. A boot program, various applications, user files, edit files, and the like may also be stored in the ROM 103 or the external memory 110. A network I/F 104 connects the application server 100 to the network 150, to allow communication with other devices on the network 150.

A keyboard I/F 105 controls access between the keyboard 108 or a pointing device (not shown) and a system bus 111. A display I/F 106 controls access between the display 109 and the system bus 111. An external memory I/F 107 controls access between the external memory 110 and the system bus 111. The system bus 111 connects the components from the CPU 101 to the external memory I/F 107 so as to communicate with each other.

The application server 100 operates when the CPU 101 executes the basic I/O program and the OS stored in the ROM 103 or the external memory 110. When the application server 100 is powered on, the OS is read from the ROM 103 or the external memory 110 into the RAM 102, by the initial program loading function of the basic I/O program, and is operated.

The following describes the hardware structure of the MFP 130. A network I/F 131 connects the MFP 130 to the network 150, to allow communication with other devices on the network 150. A CPU 132 reads a program stored in a ROM 134 or an external memory 142 into a RAM 133 and executes the program, to control the overall MFP 130. A control program for realizing the operations in this embodiment and the like are stored in the ROM 134 or the external memory 142.

The CPU 132 can communicate with the client terminal 120 via the network I/F 131, and also transmit the device information of the MFP 130 and the like to the application server 100. Examples of the device information include state information specific to the MFP 130 and security policy setting information set in the MFP 130.

The RAM 133 is used as a main memory, a work area, and the like by the CPU 132. The memory capacity of the RAM 133 can be extended using an option RAM connectable to an extension port (not shown). The RAM 133 is also used as an output information expansion area, an environmental data storage area, an NVRAM, and the like. The ROM 134 is a read-only memory. The external memory 142 is an HDD, an IC card, or the like. Applications, a control program, font data used when generating output information, and other information used in the operation of the MFP 130 are stored in the ROM 134 or the external memory 142.

An operation unit I/F 135 controls access between an operation unit 136 and a system bus 143. For example, the operation unit I/F 135 outputs edit screen data for displaying an edit screen of security policy setting information to the operation unit 136, under the control of the CPU 132. The operation unit I/F 135 also outputs operation information received from the user via the operation unit 136, to the system bus 143. The operation unit 136 includes an operation panel provided with hard keys, an LED display, and the like, and accepts each function execution instruction from the user.

A printer I/F 137 controls access between a printer 138 and the system bus 143. For example, the printer I/F 137 outputs image data to be printed to the printer 138, under the control of the CPU 132. The printer 138 is a printer engine, and includes an image processing unit that performs image processing on image data and a printing mechanism such as a recording head. A scanner I/F 139 controls access between a scanner 140 and the system bus 143. For example, the scanner I/F 139 receives read data obtained by the scanner 140 optically reading an original, and outputs the read data to the system bus 143, under the control of the CPU 132.

An external memory I/F 141 (memory controller) controls access between the external memory 142 and the system bus 143. For example, the external memory I/F 141 controls data write/read on the external memory 142 from another block connected to the system bus 143. The number of external memories 142 may be one or more. A plurality of external memories 142 storing option font cards to be added to built-in fonts or programs for interpreting printer control languages of different language systems may be connected. The MFP 130 may also include an NVRAM (not shown).

For example, print mode setting information from the operation unit 136 may be stored in the NVRAM. The system bus 143 connects the components from the network I/F 131 to the operation unit I/F 135, the printer I/F 137, the scanner I/F 139, and the external memory I/F 141 so as to communicate with each other.

FIG. 2 is a diagram showing the software structure of the network device management system 1. The software structure of the application server 100 is described first. Each module of the application server 100 is stored in the external memory 110 in the form of files. When the OS or another module calls these files, the CPU 101 loads the files into the RAM 102 and executes the files. A network device management application 202 is stored in a CD-ROM (not shown) of the external memory 110, or stored in the external memory 110 via the network 150.

A network module 200 communicates with other network devices such as the client terminal 120 and the MFP 130 via the network 150, by a given communication protocol. A web server service module 201 returns an HTTP response when, for example, receiving an HTTP request for requesting a predetermined application service from a web browser 221 in the client terminal 120. The web server service module 201 may return web page data stored in the external memory 110, as the HTTP response. The HTTP response may be generated in response to a request from a UI module 203 in the network device management application 202.

The network device management application 202 is an application for managing the network devices such as the MFP 130 that are connected to the application server 100 via the network 150. The network device management application 202 starts its process, for example in response to a request for a web page provided by the web server service module 201. Thus, the network device management application 202 can provide a web application service for managing the network devices such as the MFP 130, in cooperation with the web server service module 201.

In this embodiment, the network device management application 202 edits the settings of the security policy setting information of each network device, and delivers the edited setting information to the network device. The network device management application 202 can also display an edit screen of setting information of an unsupported version, on the application server 100 using edit screen information of another network device. The edit screen information is, for example, drawing data (edit screen data) used for an edit screen display process. The unsupported version is, for example, a version newer than (released after) the currently supported version of the security policy.

The UI module 203 in the network device management application 202 generates an HTTP response, in response to a request from the web server service module 201. The UI module 203 also receives user input information transmitted from the web browser 221 in the client terminal 120, and calls another module such as a search module 204 or a security policy management module 205 according to need.

The search module 204 searches for each network device such as the MFP 130 connected to the application server 100 via the network 150, by a given communication protocol. The search module 204 performs the search by, for example, the Simple Network Management Protocol (SNMP) or the Service Location Protocol (SLP). Another communication protocol such as the Web Services Dynamic Discovery (WS-Discovery) may be used in the search. For example, upon finding the MFP 130, the search module 204 obtains device information from the MFP 130, and stores the device information in a network device management table 301 in a database server service module 206 described later. Meanwhile, the device information of the application server 100 is stored in an application server management table 300.

The SP management module 205 obtains security policy setting information (SP setting information) from each network device such as the MFP 130. The SP management module 205 has an SP setting information edit function, and a function of delivering SP setting information to each network device such as the MFP 130. The SP setting information edit function is a function of generating display data of an edit screen for editing SP setting information, and displaying the edit screen on the display 109 based on the display data. As mentioned earlier, the security policy setting information differs in items and the like depending on the version. For example, a predetermined version of security policy includes guest account prohibition setting, password cache prohibition setting, initial password change enforcement setting, and the like, as setting items. The network device management application 202 can display an edit screen on the display 109, for a version of security policy that can be supported by the application server 100. The SP management module 205 can also dynamically update the management table for managing network devices shown in FIG. 3, according to an SPVer identifier included in SP setting information obtained from each network device such as the MFP 130.

The database server service module 206 manages the tables shown in FIGS. 3 and 4 described later, and stores/extracts data in the tables in response to a request from another module. Though the database server service module 206 is included in the application server 100 in FIG. 2, the database server service module 206 may be included in a device other than the application server 100 so long as it is accessible from the network device management application 202.

The software structure of the client terminal 120 is described next. Each module of the client terminal 120 is stored in the ROM 103 or the external memory 110 in the client terminal 120 in the form of files. When the OS or another module calls these files, the CPU 101 in the client terminal 120 loads the files into the RAM 102 in the client terminal 120 and executes the files.

A network module 220 communicates with other network devices such as the application server 100 and the MFP 130 via the network 150, by a given communication protocol. The web browser 221 transmits an HTTP request to the application server 100 via the network module 220 and receives an HTTP response from the application server 100, as an example.

The software structure of the MFP 130 is described next. Each module of the MFP 130 is stored in the ROM 134 or the external memory 142 in the form of files. The CPU 132 loads the files into the RAM 133, and executes the files. A network module 230 communicates with other network devices such as the application server 100 and the client terminal 120 via the network 150, by a given communication protocol.

An SP management module 231 manages the SP setting information of the MFP 130. The SP management module 231 receives SP setting information delivered from the SP management module 205 in the network device management application 202 via the network module 230, and sets the setting information in the MFP 130. The SP management module 231 also transmits the SP setting information of the MFP 130 to the application server 100, in response to a request from the SP management module 205 in the network device management application 202. Moreover, in the case where the MFP 130 has an SP setting information edit function, the SP management module 231 provides the SP setting information edit function to the application server 100 in response to an SP setting information edit function use request from the SP management module 205.

The SP setting information edit function is a function of generating drawing data (edit screen data) used for a process of displaying an edit screen for editing SP setting information, and displaying the edit screen on the operation unit 136 based on the display data. In the case where the MFP 130 has the SP setting information edit function, the SP management module 231 transmits the drawing data of the edit screen to the application server 100 upon receiving the SP setting information edit function use request from the application server 100. An UI module 232 generates drawing data of a user interface screen (edit screen) displayed on the operation unit 136 in the MFP 130. The UI module 232 also generates drawing data, in response to acceptance of a user operation on a user interface screen displayed on the operation unit 136 or remotely displayed on the application server 100.

Thus, in this embodiment, when the MFP 130 receives an edit function use request from the application server 100, the MFP 130 transmits drawing data of an edit screen displayed on the MFP 130, to the application server 100. When a user operation is performed on the display 109 in the application server 100, drawing data corresponding to the operation is transmitted back to the MFP 130. This realizes a remote operation as if a user operation is performed on the MFP 130. Through the function of remotely displaying an edit screen on the MFP 130, the application server 100 can edit setting information of a version not supported by the application server 100.

FIGS. 3A to 3C and 4A to 4D are diagrams each showing a table stored in the database server service module 206. The application server management table 300 shown in FIG. 3A is a table for managing setting information for the application server 100. The application server management table 300 includes an application server identifier in an item 310, a computer name in an item 311, a system name in an item 312, an IP address in an item 313, an administrator in an item 314, and an SPVer identifier in an item 315.

The application server identifier is an identifier for uniquely identifying the application server 100. The computer name is the name of the application server 100. The system name is the name of the system in which the application server 100 is used. The IP address is the IP address of the application server 100. The administrator is the name of the administrator of the application server 100. The SPVer identifier indicates the version of security policy that can be supported. In FIG. 3A, the SPVer identifier is "2.0.0". This means the version of security policy supported by the application server 100, including subversion information, is "2.0.0".

The network device management table 301 shown in FIG. 3B is a table for managing information for each network device to be managed by the network device management application 202. The network device management table 301 includes a network device identifier in an item 320, a device name in an item 321, a product name in an item 322, an IP address in an item 323, a serial number in an item 324, an installation location in an item 325, an administrator in an item 326, an SPVer identifier in an item 327, and SP edit function availability in an item 328. Though only the multifunction peripherals are shown as the devices to be managed in FIG. 3B, other types of network devices such as single-function apparatuses may be included. The following description assumes the network device to be the MFP 130.

The network device identifier is an identifier for uniquely identifying the MFP 130. The device name is the name of the MFP 130. The product name is the product name of the MFP 130. The IP address is the IP address of the MFP 130. The serial number indicates apparatus-specific identification information such as a MAC address. The installation location is the location where the MFP 130 is installed. The administrator is the name of the administrator of the MFP 130. The SPVer identifier indicates the version of security policy that can be supported. In FIG. 3B, the SPVer identifier of MFP A is "1.0.0". This means the version of security policy set in MFP A is "1.0.0". The SP edit function is information indicating, for each MFP, whether or not the above-mentioned SP setting information edit function is available (TRUE/FALSE). For example, the application server 100 may collect and obtain the SP edit function availability information as device information from each network device at predetermined regular time intervals.

An SP management table 302 shown in FIG. 3C is a table for managing each security policy. The SP management table 302 includes an SP identifier in an item 330, an SP name in an item 331, an SPVer identifier in an item 332, an SP setting identifier in an item 333, and a last update date and time in an item 334.

The SP identifier is an identifier for uniquely identifying the security policy. The SP name is a name given to the security policy. The SPVer identifier indicates the version of the security policy. The SPVer identifier is used when identifying a setting management table of each version of the security policy shown in FIGS. 4A to 4C. The SP setting identifier is an identifier for uniquely identifying the settings in the setting management table identified by the SPVer identifier. For example, the settings of "security policy for building A" are identified by the SPVer identifier "1.0.0" and the SP setting identifier "1". This corresponds to "guest account prohibition: FALSE to audit log enforcement: FALSE" in the top row in FIG. 4A. The last update date and time is the date and time at which the information about the security policy of the corresponding name was last updated.

FIGS. 4A to 4C are tables showing setting information corresponding to the respective versions of security policy. An SPv1 management table 400 shown in FIG. 4A is a table for managing setting information of security policy corresponding to major version v1. The SPv1 management table 400 includes an SP setting identifier in an item 410, guest account prohibition in an item 411, password cache prohibition in an item 412, initial password change enforcement in an item 413, plaintext authentication prohibition in an item 414, SNMPv1 prohibition in an item 415, audit log enforcement in an item 416, and SPVer in an item 417.

The SP setting identifier corresponds to the SP setting identifier in FIG. 3C. The SPVer indicates the version of security policy. The guest account prohibition to the audit log enforcement are an example of typical security items. For instance, in the case where the guest account prohibition is set to "TRUE", login using a guest account is prohibited. The settings of the setting information can be uniquely identified by the SP setting identifier in the SPv1 management table 400 as shown in FIG. 4A.

An SPv2 management table 401 shown in FIG. 4B is a table for managing setting information of security policy corresponding to major version v2. The SPv2 management table 401 includes an SP setting identifier in an item 420, guest account prohibition in an item 421, password cache prohibition in an item 422, initial password change enforcement in an item 423, plaintext authentication prohibition in an item 424, SNMPv1 prohibition in an item 425, audit log enforcement in an item 426, a password time limit (days) in an item 427, password complexity in an item 428, and SPVer in an item 429. The SP setting identifier and the SPVer are the same as those described with reference to FIG. 4A. The guest account prohibition to the audit log enforcement are an example of typical security items. The password time limit and the password complexity are the items added to the SPv1 management table 400.

An SPv3 management table 402 shown in FIG. 4C is a table for managing setting information of security policy corresponding to major version v3. The SPv3 management table 402 includes an SP setting identifier in an item 430, guest account prohibition in an item 431, password cache prohibition in an item 432, initial password change enforcement in an item 433, plaintext authentication prohibition in an item 434, SNMPv1 prohibition in an item 435, audit log enforcement in an item 436, a password time limit (days) in an item 437, password complexity in an item 438, firewall enforcement in an item 439, SNTP enforcement in an item 440, weak encryption prohibition in an item 441, and SPVer in an item 442. The SP setting identifier and the SPVer are the same as those described with reference to FIG. 4A. The guest account prohibition to the password complexity are an example of typical security items. The firewall enforcement, the SNTP enforcement, and the weak encryption prohibition are the items added to the SPv2 management table 401.

As shown in FIGS. 4A to 4C, the setting items of the SP setting information can be extended and the settings can be changed as the version of security policy increases. The tables shown in FIGS. 4A to 4C may be generated from device information transmitted from each network device such as the MFP 130, or newly generated dynamically based on the existing SPv1 management table 400 to SPv3 management table 402.

An SP delivery task management table 403 shown in FIG. 4D is a table for managing delivery task information for delivering SP setting information to each network device such as the MFP 130. The SP delivery task management table 403 includes a task identifier in an item 440, a task name in an item 441, an execution date and time in an item 442, a task state in an item 443, a network device identifier in an item 444, SPVer in an item 445, and an SP identifier in an item 446. The task identifier is an identifier for uniquely identifying the delivery task. The task name is the name of the delivery task. The execution date and time is the date and time at which the delivery task is scheduled to be executed or was executed. The task state indicates the state of the transmission process (delivery process) to the network device corresponding to the delivery task. For example, the task state indicates that the transmission process to the network devices corresponding to SP delivery task 1 has been completed, and the transmission process to the network devices corresponding to each of SP delivery tasks 3 and 4 is on standby. The network device identifier is an identifier for uniquely identifying the delivery destination network device. An IP address or the like may be used as the network device identifier. The SP identifier is an identifier for uniquely identifying the security policy as in FIG. 3C.

Figure 5A:
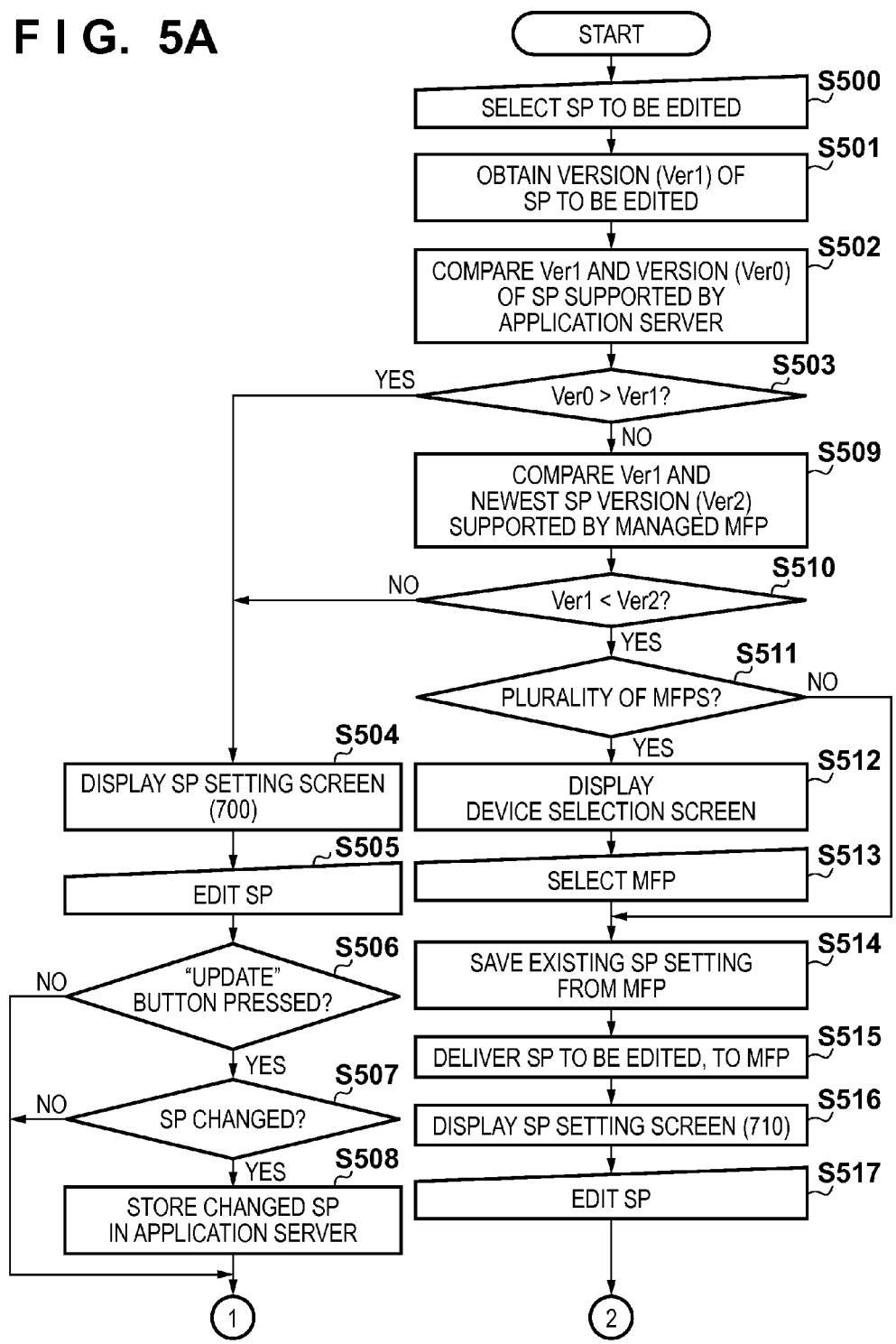
FIGS. 5A and 5B are diagrams showing a display control process for a setting information edit screen.
Figure 5B:
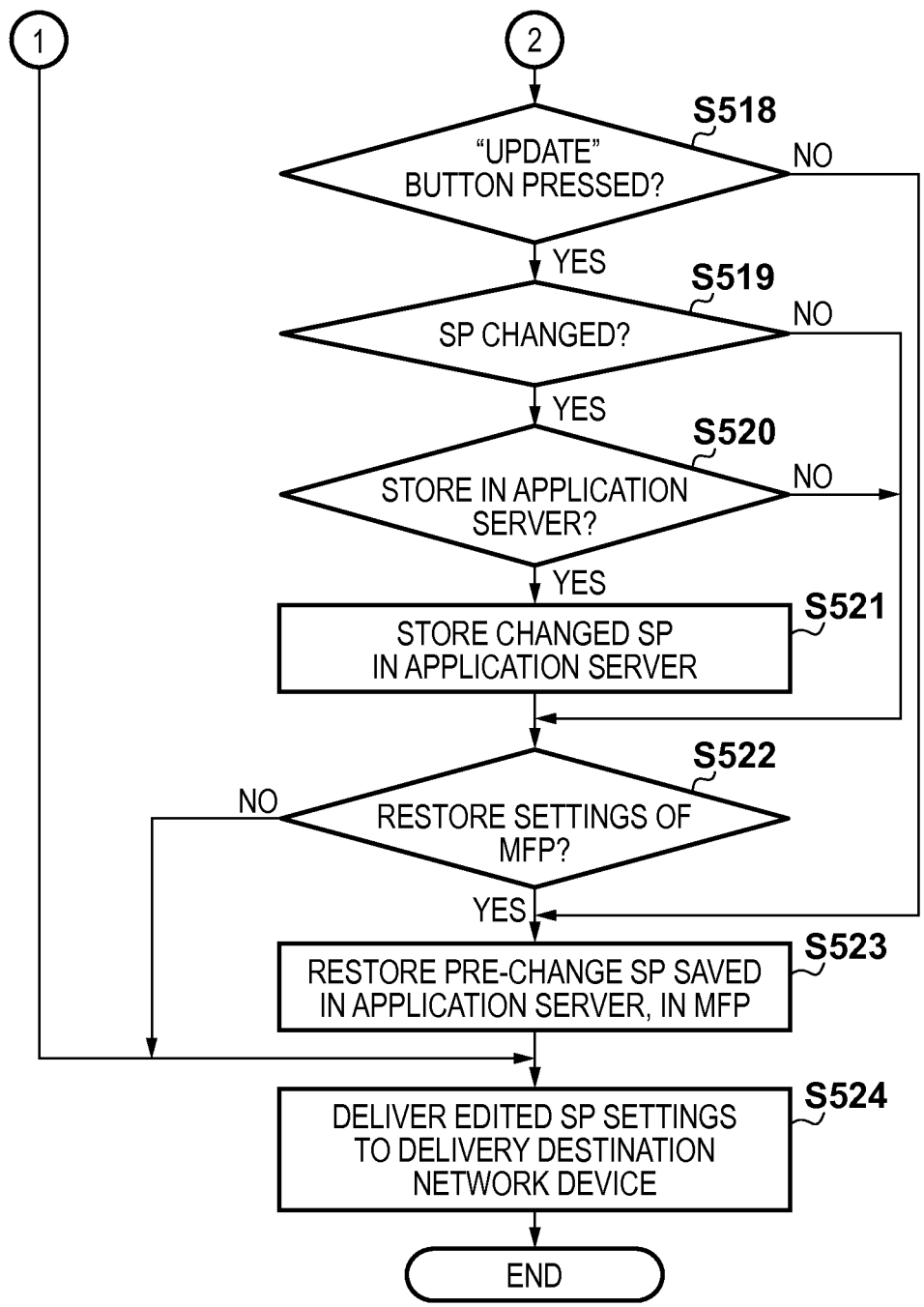

The following describes the operation when the SP edit function of the MFP 130 is used upon editing security policy (SP) setting information, with reference to FIGS. 5A to 7B. In this embodiment, the application server 100 and the MFP 130 each include a web server, and are capable of SP check or edit from their SP management web pages. The application server 100 has security policy setting screens 700 and 710 shown in FIGS. 7A and 7B, as SP management web pages. The MFP 130 has the same screen as the security policy setting screen 700, though not shown. Each process shown in FIGS. 5A and 5B is realized by, for example, the CPU 101 in the application server 100 reading the control program from the ROM 103 into the RAM 102 and executing the control program.

Figure 7A:
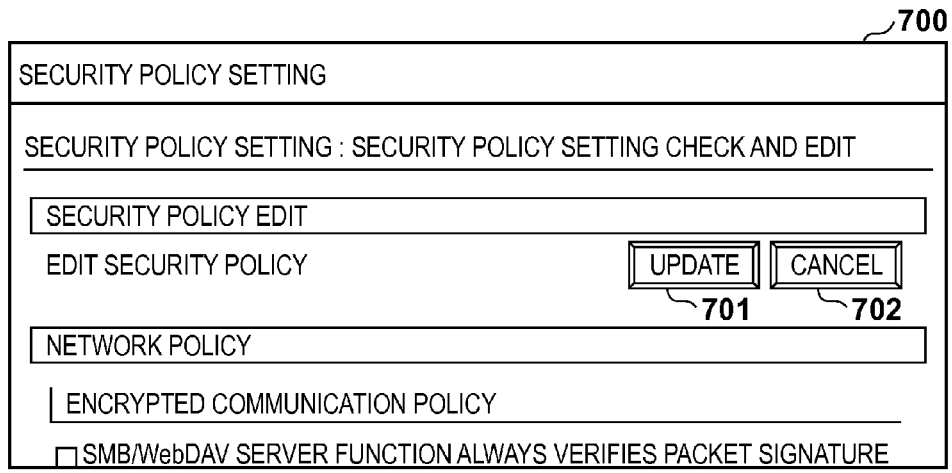
FIGS. 7A and 7B are diagrams each showing an example of a security policy setting screen.
Figure 7B:
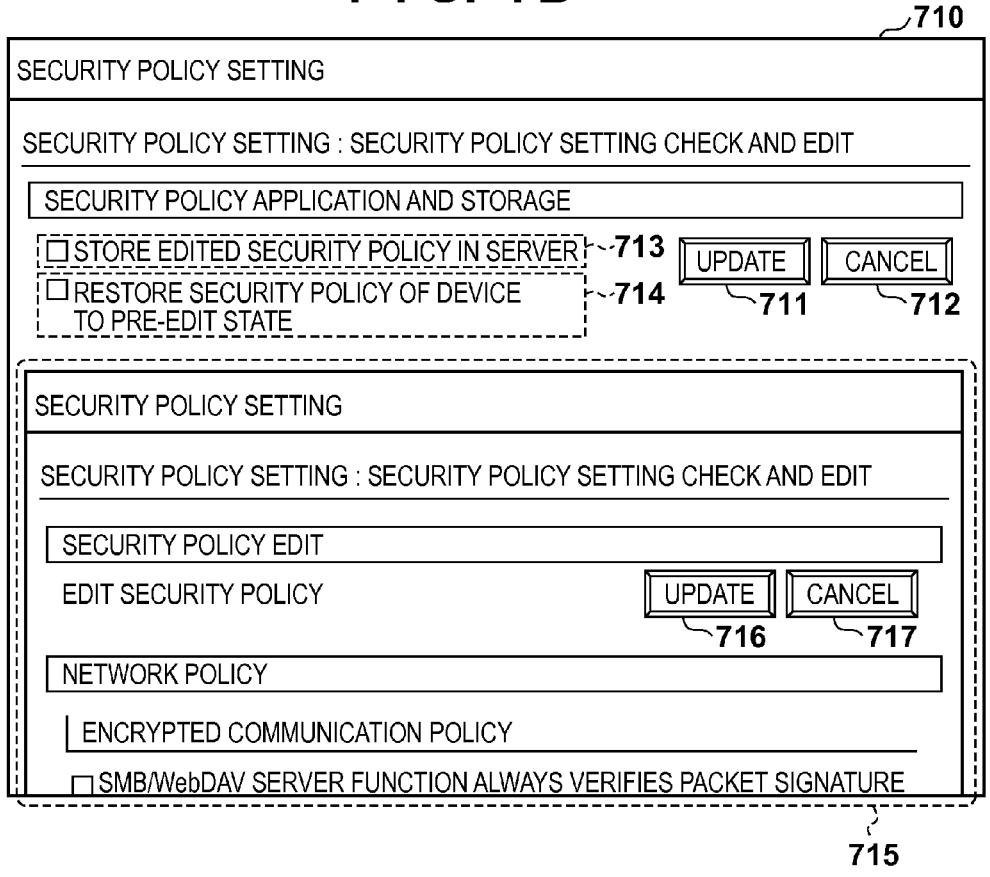

The security policy setting screen 700 shown in FIG. 7A is an example of the security policy setting screen of the version supportable by the application server 100. The security policy setting screen 710 shown in FIG. 7B is an example of retrieving and remotely displaying a security policy setting screen 715 of the MFP 130 as an inline frame. Through the display shown in FIG. 7B, the application server 100 can display the security policy setting screen of the version not supported by the application server 100, too.

In step S500, the CPU 101 obtains the setting information of the SP management table 302 and the SPv1 management table 400 to the SPv3 management table 402 from the database server service module 206, by the SP management module 205 in the network device management application 202. Based on the obtained setting information, the CPU 101 displays a selection screen for selecting a security policy to be edited, on the display 109.

FIG. 6A is a diagram showing an example of the selection screen displayed in step S500. A selection screen 600 displays the name, the version, and the last update date and time. The name corresponds to the SP name in the SP management table 302 in FIG. 3C. The version is version information uniquely identified from the SPv1 management table 400 to the SPv3 management table 402, by the SPVer identifier and the SP setting identifier in FIG. 3C. The last update date and time corresponds to the last update date and time in the SP management table 302 in FIG. 3C. The user selects any of the displayed security policies using a radio button 601, and presses an edit button 602.

In step S501, the CPU 101 obtains the SPVer 332 ("Ver1" in FIG. 5A) corresponding to the version information of the SP setting information selected in step S500, with reference to the SP management table 302. The CPU 101 then proceeds to step S502. In step S502, the CPU 101 obtains the SPVer 315 ("Ver0" in FIG. 5A) which is the SP version supported by the application server 100 with reference to the application server management table 300, and compares the versions. The CPU 101 then proceeds to step S503.

In step S503, the CPU 101 determines the result of comparison between the SP version of the SP setting information to be edited, which is obtained in step S501, and the SP version supported by the application server 100. The CPU 101 determines whether or not the SP version supported by the application server 100 is newer than the SP version of the SP setting information to be edited, which is obtained in step S501. In the case of determining that the SP version supported by the application server 100 is newer than the SP version obtained in step S501, the CPU 101 proceeds to step S504. In the case of determining that the SP version supported by the application server 100 is not newer than the SP version obtained in step S501, the CPU 101 proceeds to step S509.

Whether or not the version selected on the selection screen is newer than the version supported by the application server 100 is determined in step S503. This is because the items of the setting information are extended as the version is updated (the version number increases). In this case, for example when the major version supported by the application server 100 is "2", the supportable major versions are "1" and "2", while the versions greater than or equal to "3" are not supportable. Alternatively, for example, whether or not the version selected on the selection screen is a version supported by the application server 100 may be determined according to supportability information for each version by the application server 100. In such a case, the CPU 101 proceeds to step S504 when determining that the version selected on the selection screen is a version supported by the application server 100.

In step S504, the CPU 101 displays the security policy setting screen 700 held by the network device management application 202, on the display 109. In step S505, the user performs an operation of checking or editing the SP on the security policy setting screen 700 displayed in step S504. The CPU 101 then proceeds to step S506.

FIG. 8 is a diagram showing an example of the edit screen displayed in step S504. For example, the screen in FIG. 8 is displayed when an update button 701 in FIG. 7 is pressed. Information about the security policy selected by the user on the selection screen in FIG. 6A is displayed in a display area 800 in FIG. 8. For instance, the name, the version, and the last update date and time displayed in a display area 601 in FIG. 6A are displayed in the display area 800. The setting information for the application server 100 obtained in step S502 is displayed in a display area 801. Here, any item(s) of the information obtained in step S502 may be displayed.

An SP setting information edit screen is displayed in a display area 802, based on the SP setting information obtained in step S501. For example, since version v1.0.0 is to be edited as displayed in the display area 800, the setting items from the guest account prohibition to the audit log enforcement shown in FIG. 4A are displayed to be selectable by a radio button in the display area 802. When the user presses a button 803 in FIG. 8, the selection screen in FIG. 6A is displayed again. When the user presses a button 805, the selection operation by the user is canceled.

The SP management module 205 supports the version "2.0.0" of security policy as shown in FIG. 3A. On the other hand, the version of security policy to be edited, which is selected by the user on the selection screen in FIG. 6A, is "1.0.0" as shown in the display area 800. Since the user selects the version supportable by the SP management module 205 in this case, the SP management module 205 displays the edit screen using its edit screen display function.

In step S506, the CPU 101 determines whether the update button 701 or a cancel button 702 in the security policy setting screen 700 displayed in step S504 is pressed. In the case of determining that the update button 701 is pressed, the CPU 101 proceeds to step S507. In the case of determining that the cancel button 702 is pressed, the CPU 101 proceeds to step S524.

In step S507, the CPU 101 determines whether or not the SP is changed as a result of the SP edit operation by the user in step S505. In the case of determining that the SP is changed, the CPU 101 proceeds to step S508. In the case of determining that the SP is not changed, the CPU 101 proceeds to step S524. The determination in step S507 may be made based on, for example, whether or not a register button 804 in FIG. 8 is pressed. In step S508, the CPU 101 reflects the SP setting information edited as a result of the SP edit operation by the user in step S505, in any of the SP management tables 400 to 402 in the database server service module 206. The CPU 101 then proceeds to step S524. Upon the reflection, the CPU 101 updates the last update date and time in FIG. 3C, and updates the corresponding table in FIGS. 4A to 4C based on the edited settings. After this, in step S524, the CPU 101 transmits the SP setting information edited on the edit screen 802, to the delivery destination network device. The process of transmission to the delivery destination network device will be described later.

According to the above description, in step S503, the SP management module 205 compares the version of security policy selected by the user on the selection screen in FIG. 6A and the version of security policy supported by the application server 100. However, in addition to comparison of the versions, it is possible to determine whether or not each setting item of the setting information of the security policy selected by the user on the selection screen in FIG. 6A conforms to the edit function of the SP management module 205.

The case where the CPU 101 determines in step S503 that the SP version supported by the application server 100 is not newer than the SP version obtained in step S501 is described below.

In step S509, the CPU 101 compares the SP version of the SP setting information to be edited and the newest SP version ("Ver2" in FIG. 5A) supported by the MFP 130 managed by the application server 100. In step S510, the CPU 101 determines whether or not the newest SP version supported by the MFP 130 managed by the application server 100 is newer than the SP version of the SP setting information to be edited. In the case of determining that the SP version supported by the MFP 130 managed by the application server 100 is newer than the SP version of the SP setting information to be edited, the CPU 101 proceeds to step S511. In the case of determining that the SP version supported by the MFP 130 managed by the application server 100 is not newer than the SP version of the SP setting information to be edited, the CPU 101 proceeds to step S504.

In the case of proceeding from step S510 to step S504, the CPU 101 displays difference information between the SP versions by, for example, a security policy setting screen 900 shown in FIG. 11A described later. The CPU 101 updates the network device management application 202 in the application server 100 based on the difference information to update the supported SP version, thus enabling the subsequent processes from step S504.

In step S511, the CPU 101 determines whether or not a plurality of MFPs 130 support the SP version newer than the SP version of the SP setting information to be edited. In the case of determining that a plurality of MFPs 130 support the SP version, the CPU 101 proceeds to step S512. In the case of determining that a plurality of MFPs 130 do not support the SP version, the CPU 101 proceeds to step S514.

For example, in step S511, the CPU 101 obtains information about each network device with reference to the network device management table 301 managed in the database server service module 206, by the SP management module 205. The CPU 101 then searches for each network device that supports the version of the security policy selected on the selection screen in FIG. 6A and is capable of performing the SP setting information edit screen display function. Whether or not the version is supported is determined with reference to the SPVer identifier item in the network device management table 301, and whether or not the edit screen display function is available is determined with reference to the SP edit function item in the network device management table 301.

In step S512, the CPU 101 displays a security policy edit device list 610 on the display 109, and proceeds to step S513. FIG. 6B is a diagram showing an example of a network device selection screen. The device name, the product name, and the IP address are displayed on the selection screen 610 based on the information about each network device found in step S511, where each network device is selectable by a radio button 611. Here, any item(s)

of the information about each network device found in step S511 is displayed. The version supported by each network device is displayed as well, as shown in FIG. 6B. Suppose version 2.0.0 is selected on the selection screen in FIG. 6A. Then, version 2.0.0 is displayed as the version supported by each network device in FIG. 6B, as an example. If each network device is capable of supporting a version older than the currently supported version, for example, version 3.0.0 released after version 2.0.0 may be displayed. When the user presses a button 613 in FIG. 6B, the selection screen in FIG. 6A is displayed again. When the user presses a button 614, the selection operation by the user is canceled.

In step S513, upon accepting the user's selection operation of the MFP 130 using the radio button 611 and press of a selection button 612 in the security policy edit device list 610, the CPU 101 selects the MFP 130 to edit the SP, and proceeds to step S514. In step S514, the CPU 101 obtains existing SP setting information from the MFP 130 selected in step S513, and stores and saves the SP setting information in the database server service module 206 in the application server 100. The CPU 101 then proceeds to step S515. In step S515, the CPU 101 delivers the SP setting information (including information about the items corresponding to the version) selected in step S500, to the MFP 130 selected in step S513. The CPU 101 then proceeds to step S516.

In step S514, the CPU 101 obtains, based on the information of the network device selected by the user on the selection screen 610, the SP setting information currently set in the network device, by the SP management module 205. This is because, in the case of editing the SP setting information of the version selected by the user and delivering the edited SP setting information, the delivery needs to be limited to the delivery destination network device. In the case where the network device supporting the version selected by the user is found in step S511, the edit screen of the found network device is remotely displayed on the application server 100 in step S516, to enable the edit operation corresponding to the version. In this case, when the edit operation is completed by pressing the register button, the edited SP setting information is set in the network device. Here, if the network device is not a device subjected to delivery from the application server 100, the edited SP setting information will end up being wrongly set in the network device. In view of such circumstances, in this embodiment, the (pre-edit) SP setting information currently set in the network device is obtained (saved/migrated) and temporarily held in the RAM 102 or the like in the application server 100, in step S514 before the remote display.

In step S516, the CPU 101 displays, on the display 109, the security policy setting screen 710 of the application server 100 by retrieving and remotely displaying the security policy setting screen 715 of the MFP 130 as an inline frame. The CPU 101 then proceeds to step S517. The button control on the security policy setting screen 710 will be described later, with reference to FIG. 9.

Thus, in this embodiment, the CPU 101 in the application server 100 accesses the edit function of the SP management module 231 in the network device found in step S511, and transmits the information about the items corresponding to the version to be edited. The CPU 101 then remotely displays the edit screen corresponding to the edit function of the network device, on the display 109. In the edit screen display operation, the application server 100 obtains the drawing data of the edit screen from the network device, and transmits the drawing data corresponding to the edit screen operation on the application server 100 back to the network device.

In step S517, the user performs an operation of checking or editing the SP on the security policy setting screen 710 displayed in step S516. The CPU 101 then proceeds to step S518. Here, the case where the user performs an operation of checking or editing the SP is the case where the user presses an update button 716 on the security policy setting screen 715 in FIG. 7B and performs an operation of checking or editing the SP.

FIG. 9 is a diagram showing an example of the edit screen displayed in step S517. For example, the screen in FIG. 9 is displayed when the update button 716 is pressed. Information about the security policy selected by the user on the selection screen in FIG. 6A is displayed in a display area 900 in FIG. 9. For instance, the name, the version, and the last update date and time displayed in the display area 601 in FIG. 6A are displayed in the display area 900. Information about the network device selected in a security policy edit device list 610 is displayed in a display area 901. Here, any item(s) of the information about the network device may be displayed.

An SP setting information edit screen is displayed in a display area 902, based on the SP setting information obtained in step S501. For example, since version v3.0.0 is to be edited as displayed in the display area 900, the setting items from the guest account prohibition to the audit log enforcement shown in FIG. 4C are displayed to be selectable by a radio button in the display area 902. When the user presses a button 903 in FIG. 9, the selection screen in FIG. 6A is displayed again. When the user presses a button 905, the selection operation by the user is canceled.

The SP management module 205 supports the version "2.0.0" of security policy as shown in FIG. 3A. On the other hand, the version of security policy to be edited, which is selected by the user on the selection screen in FIG. 6A, is "3.0.0" as shown in the display area 900. Since the user selects the version not supported by the SP management module 205 in this case, the SP management module 205 remotely displays the edit screen of the network device supporting the selected version, to enable the edit operation in the application server 100.

In step S518, the CPU 101 determines whether an update button 711 or a cancel button 712 in the security policy setting screen 710 displayed in step S516 is pressed. In the case of determining that the update button 711 is pressed, the CPU 101 proceeds to step S519. In the case of determining that the cancel button 712 is pressed, the CPU 101 proceeds to step S523.

In step S519, the CPU 101 determines whether or not the SP is changed as a result of the SP edit operation by the user in step S517. In the case of determining that the SP is changed, the CPU 101 proceeds to step S520. In the case of determining that the SP is not changed, the CPU 101 proceeds to step S522. The determination in step S519 may be made based on, for example, whether or not a register button 904 in FIG. 9 is pressed. In step S520, the CPU 101 determines whether or not to store the changed SP setting information in the application server 100. In the case of determining to store the changed SP setting information in the application server 100, the CPU 101 proceeds to step S521. In the case of determining not to store the changed SP setting information in the application server 100, the CPU 101 proceeds to step S522. In the determination process in step S520, the CPU 101 determines to store the changed SP setting information in the application server 100 if a checkbox 713 to "store edited security policy in server" in FIG. 7B is checked. In step S521, the CPU 101 obtains the changed SP setting information from the MFP 130, and stores the SP setting information in the database server service module 206. The CPU 101 then proceeds to step S522. Upon the storage, the CPU 101 updates the last update date and time in FIG. 3C, and updates the corresponding table in FIGS. 4A to 4C based on the edited settings.

In step S522, the CPU 101 determines whether or not to restore the pre-change SP setting information stored in the application server 100 in step S514, in the MFP 130. In the case of determining to restore the pre-change SP setting information in the MFP 130, the CPU 101 proceeds to step S523. In the case of determining not to restore the pre-change SP setting information in the MFP 130, the CPU 101 proceeds to step S524. In the determination process in step S522, the CPU 101 determines to restore the pre-change SP setting information in the MFP 130 if a checkbox 714 to "restore security policy of device to pre-change state" in FIG. 7B is checked. In step S523, the CPU 101 restores the pre-change SP setting information stored and saved in the application server 100, in the MFP 130. The CPU 101 then proceeds to step S524.

The determination in step S522 may be made based on whether or not the MFP 130 subjected to the edit screen 902 is the delivery destination of the SP setting information. In the case of determining that the MFP 130 is the delivery destination in step S522, the CPU 101 proceeds to step S524, and transmits (delivers) the SP setting information edited on the edit screen 902 to the delivery destination network device on the network 150. In the case of determining that the MFP 130 is not the delivery destination in step S522, the CPU 101 restores the settings in step S523, and transmits (delivers) the SP setting information edited on the edit screen 902 to another network device which is the delivery destination on the network 150 in step S524.

In the determination of the delivery destination, the CPU 101 refers to the delivery task information in the SP delivery task table 403 from the database server service module 206, by the SP management module 205. In the case where the task state is "standby" and the network device identifier is the same as the network device identifier of the MFP 130 selected in FIG. 6B in the delivery task information, the CPU 101 determines that the MFP 130 selected in FIG. 6B is the delivery destination. Otherwise, the CPU 101 determines that the MFP 130 selected in FIG. 6B is not the delivery destination.

The operation described above is applicable to, for example, an office or the like considering phasing in new network devices of a new SP version into the existing network environment in FIG. 2. For a new network device introduced earlier, the application server edits new SP setting information using the edit screen of the new network device. For a new network device introduced later, the application server delivers the edited new SP setting information to the new network device. The application server can also deliver the edited new SP setting information to the network devices existing before the introduction of the new network devices. In each existing network device, only the setting items that can be interpreted by the existing network device are set from the new SP setting information, while the setting items that cannot be interpreted are discarded.

In the operation described above, the application server 100 manages the security information (setting information) of the system 1. Alternatively, the client 120 or the MFP 130 may hold the tables in FIGS. 3A to 3C and 4A to 4D and perform the process in FIGS. 5A and 5B, to manage the security information.

Figure 10:
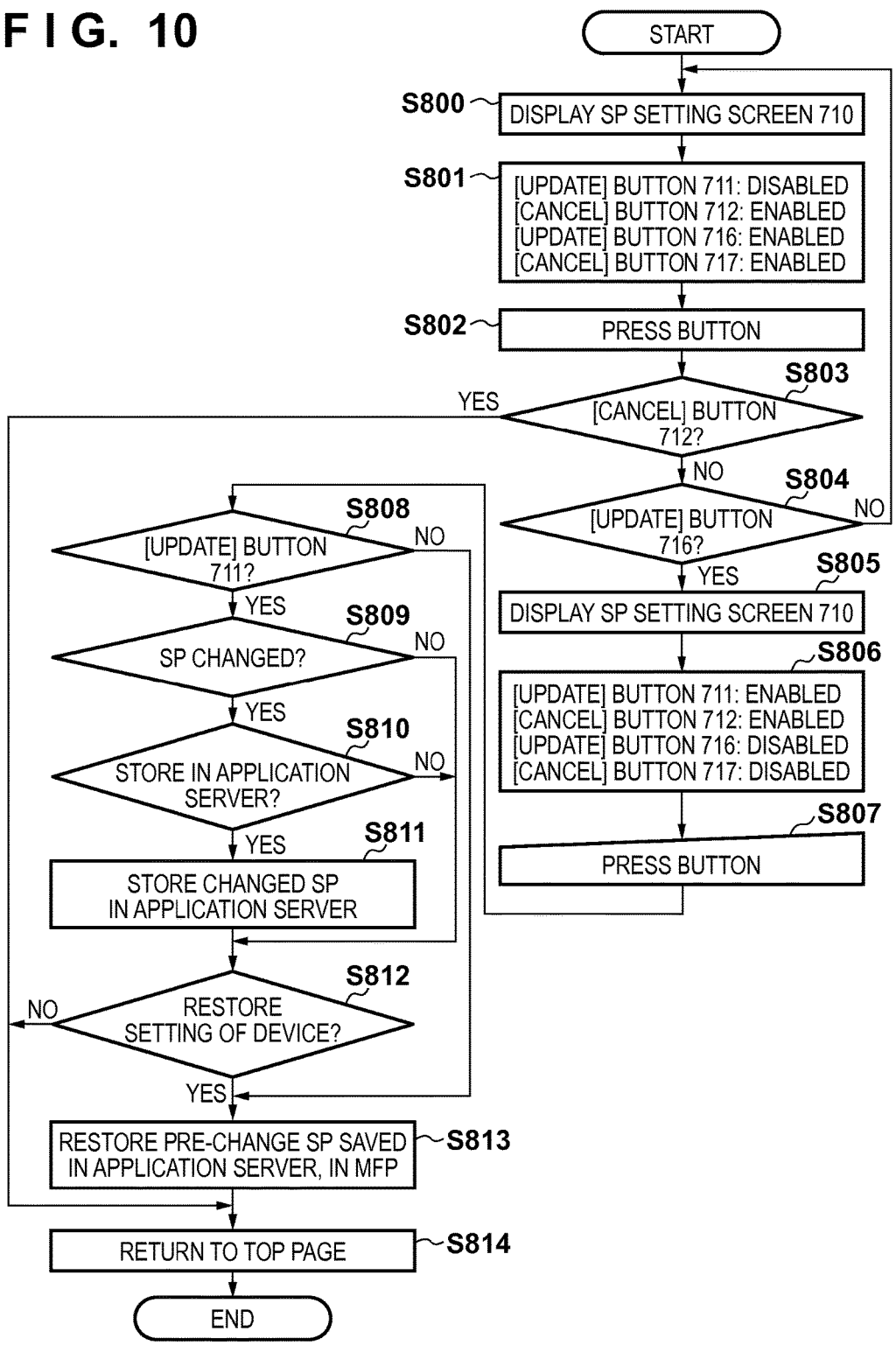
FIG. 10 is a diagram showing a button control process for a security policy setting screen.

FIG. 10 is a flowchart showing the screen control process for the security policy setting screen 710 in FIG. 7B. In step S800, the CPU 101 displays, on the display 109, the security policy setting screen 710 of the application server 100 by retrieving the security policy setting screen 715 of the MFP 130 as an inline frame. The CPU 101 then proceeds to step S801. The security policy setting screen 710 includes the security policy setting screen 715 of the MFP 130 selected in the security policy edit device list 610, as an inline frame. The MFP 130 is selected in the security policy edit device list 610, to edit the SP setting information selected in the security policy list 600.

In step S801, the CPU 101 enables or disables the attribute of each button in the security policy setting screen 710, and proceeds to step S802. Here, the CPU 101 disables the update button 711, and enables the cancel button 712, the update button 716, and the cancel button 717.

In step S802, the CPU 101 accepts a button press by the user, and proceeds to step S803. In step S803, the CPU 101 determines whether or not the button pressed in step S802 is the cancel button 712. In the case of determining that the pressed button is the cancel button 712, the CPU 101 proceeds to step S814. In the case of determining that the pressed button is not the cancel button 712, the CPU 101 proceeds to step S804.

In step S804, the CPU 101 determines whether or not the button pressed in step S802 is the update button 716. In the case of determining that the user performs an edit on the security policy setting screen 715 of the MFP 130 retrieved as an inline frame and then presses the update button 716, the CPU 101 proceeds to step S805. In the case of determining that the pressed button is not the update button 716, the CPU 101 returns to step S800.

In step S805, the CPU 101 redisplays the security policy setting screen 710, and proceeds to step S806. In step S806, the CPU 101 enables or disables the attribute of each button in the security policy setting screen 710 redisplayed in step S805, and proceeds to step S807. Here, the CPU 101 enables the update button 711 and the cancel button 712, and disables the update button 716 and the cancel button 717. For example, the update button 716 and the cancel button 717 in the security policy setting screen 715 displayed in the inline frame are sandboxed to restrict user access.

In step S807, the CPU 101 accepts a button press by the user, and proceeds to step S808. In step S808, the CPU 101 determines whether the button pressed in step S807 is the update button 711 or the cancel button 712. In the case of determining that the pressed button is the update button 711, the CPU 101 proceeds to step S809. In the case of determining that the pressed button is the cancel button 712, the CPU 101 proceeds to step S813.

In step S809, the CPU 101 determines whether or not the SP setting information is changed by the user before the button press in step S807. For example, the change of the SP setting information before the button press in step S807 corresponds to the case where the update button 716 is pressed in step S804 and the security policy is edited. In the case of determining that the SP setting information is changed, the CPU 101 proceeds to step S810. In the case of determining that the SP setting information is not changed, the CPU 101 proceeds to step S812.

In step S810, the CPU 101 determines whether or not to store the changed SP setting information in the application server 100. In the case of determining to store the changed SP setting information in the application server 100, the CPU 101 proceeds to step S811. In the case of determining not to store the changed SP setting information in the application server 100, the CPU 101 proceeds to step S812. In the determination process in step S810, the CPU 101 determines to store the changed SP setting information in the application server 100 if the checkbox 713 to "store edited security policy in server" in FIG. 7B is checked.

In step S811, the CPU 101 obtains the edited SP setting information from the MFP 130, and stores the SP setting information in the database server service module 206. The CPU 101 then proceeds to step S812. In step S812, the CPU 101 determines whether or not to restore the pre-change SP setting information stored and saved in the application server 100, in the MFP 130. In the case of determining to restore the pre-change SP setting information, which is stored in the application server 100, in the MFP 130, the CPU 101 proceeds to step S813. In the case of determining not to restore the pre-change SP setting information in the MFP 130, the CPU 101 proceeds to step S814. In the determination process in step S812, the CPU 101 determines to restore the pre-change SP setting information, which is stored and saved in the application server 100, in the MFP 130 if the checkbox 714 in FIG. 7B is checked.

In step S813, the CPU 101 restores the pre-change SP setting information stored and saved in the application server 100, in the MFP 130. The CPU 101 then proceeds to step S814. In step S814, the CPU 101 displays a top page of an SP management web page (not shown) on the display 109, and ends the process in FIG. 10.

An example of the operation when the SP setting information to be edited is edited using the SP edit function of the MFP 130 has been described above. The following describes display of a security policy setting screen in the case where the version of the SP setting information to be edited does not conform to the version supportable by the application server 100 or the MFP 130.

The security policy setting screen 900 shown in FIG. 11A has the same functions as the screens shown in FIGS. 7A and 7B, but differs in the following point. A security policy version information display area 901 is an area for displaying the version of the SP setting information to be edited and the SP version supported by the MFP 130 using the SP edit function. The SP version of the SP setting information to be edited, the SP version supported by the MFP 130 using the SP edit function, and the number of items excluded from editing due to the difference between the two versions are displayed in the security policy version information display area 901. The same information are also displayed in the case where the SP edit function of the application server 100 is used and the SP version of the SP setting information to be edited is newer than the SP version supported by the application server 100. In such a case, the item name "edit MFP" in FIG. 11A is displayed as "application server".

Figure 11A:
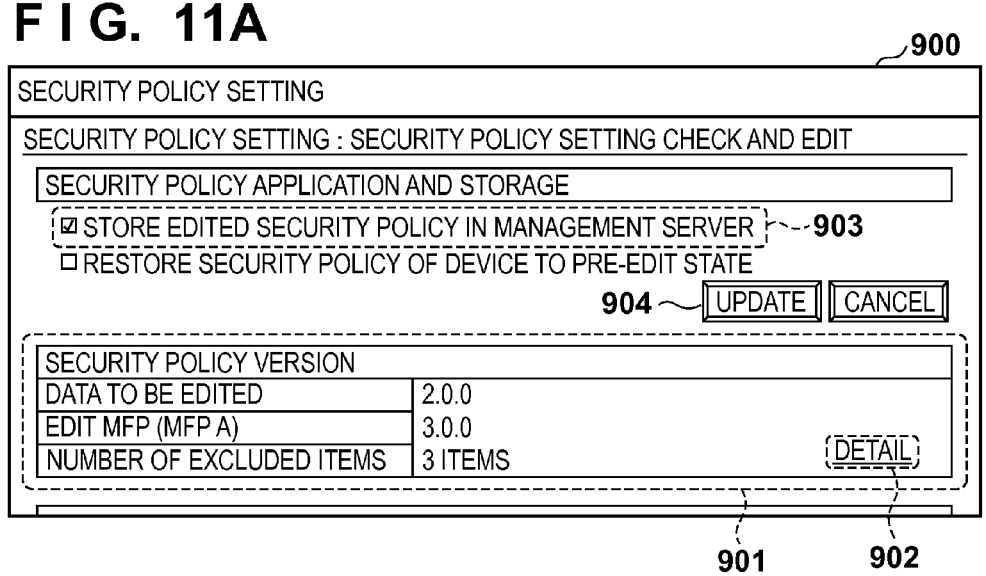
FIGS. 11A to 11C are diagrams each showing an example of a security policy setting screen.
Figure 11B:
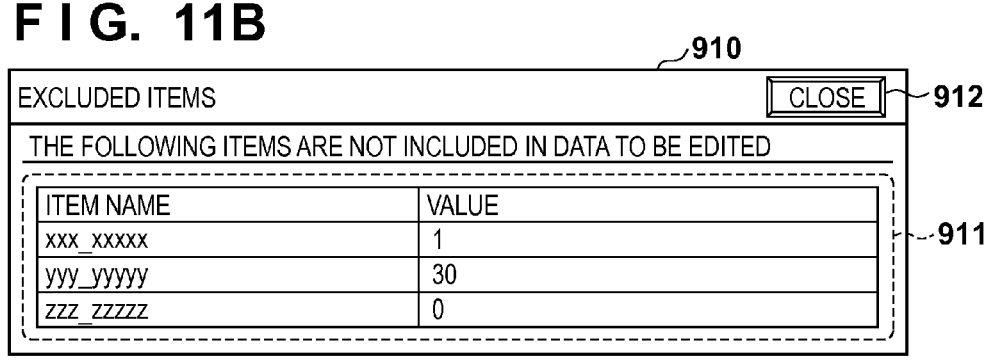

A detail link 902 is a button for displaying an "excluded items" screen 910 in FIG. 11B as a subwindow. The detail link 902 is displayed in the case where the SP version of the SP setting information to be edited does not conform to the SP version supported by the application server 100 or the MFP 130.

Figure 11C:
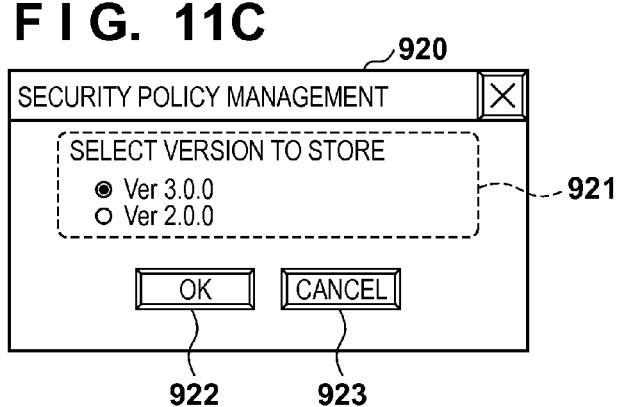

A checkbox 903 is the same checkbox to "store edited security policy in server" as the checkbox 713 in FIG. 7B. A button 904 is the same update button as the update button 711 in FIG. 7B. When the update button 904 is pressed in a state where the checkbox 903 is checked, a version selection dialog 920 (selection screen) in FIG. 11C is displayed, and the edited security policy is stored with a selected version.

In a difference display area 911 in the "excluded items" screen 910 shown in FIG. 11B, the item name of each item supported by the MFP 130 but not included in the SP setting information to be edited and the number of items are displayed as an example. This corresponds to the case where the SP version supported by the MFP 130 using the SP edit function is newer than the SP version of the SP setting information to be edited. The SP setting information in this embodiment is XML data, and the item name in the difference display area 911 is displayed based on tag information of XML data.

The information displayed in the difference display area 911 is not limited to the information supported by the MFP 130 but not included in the SP setting information to be edited, and may be the information included in the SP setting information to be edited but not supported by the MFP 130. The information supported by the MFP 130 but not included in the SP setting information to be edited is displayed, for example, in step S1009 in FIG. 12 described later. The information included in the SP setting information to be edited but not supported by the MFP 130 is displayed, for example, in step S1010 in FIG. 12 described later. Alternatively, the information included in the SP setting information to be edited but not supported by the application server 100 may be displayed. The information included in the SP setting information to be edited but not supported by the application server 100 is displayed, for example, in step S1005 in FIG. 12 described later. Such information may be displayed in the case where the CPU 101 proceeds to step S504 as a result of the determination process in step S510 in FIG. 5A. The method of generating the difference information displayed in the difference display area 911 will be described later, with reference to FIG. 12. The "excluded items" screen 910 is closed when a close button 912 is pressed.

The version selection dialog 920 is displayed when the update button 904 is pressed in a state where the checkbox 903 to "store edited security policy in server" is checked. When an OK button 922 is pressed in this dialog, the CPU 101 stores the SP setting information in the application server 100 with a version indicated by a radio button selected in a version selection unit 921. When a cancel button 923 is pressed, on the other hand, the CPU 101 closes the version selection dialog 920 and returns to the security policy setting screen 900.

The display of the screens in FIGS. 11A and 11B allows the user to recognize the difference in version and items between the SP setting information selected by the user and the SP setting information supported by the application server 100 or the MFP 130. For example, in the case where the screens in FIGS. 11A and 11B are displayed, the user can recognize that the apparatus capable of editing (changing) the SP setting information selected by the user is MFP A, and the difference in setting items from the version supported by MFP A. Based on this recognition, for example, the user can perform editing using the edit function of MFP A while newly taking into consideration the three items shown in FIG. 11B as edit items. In such a case, the data of the edited SP setting information can be stored in the application server 100 with the version selected on the screen in FIG. 11C. The application server 100 can then edit the stored data by itself, as a result of updating the version of the network device management application 202.

After the display in FIGS. 11A and 11B, the user may update the version of the network device management application 202 in the application server 100, with the version of MFP A displayed in FIG. 11A. This enables the application server 100 to edit the three items by itself. The application server 100 may then perform editing.

Figure 12:
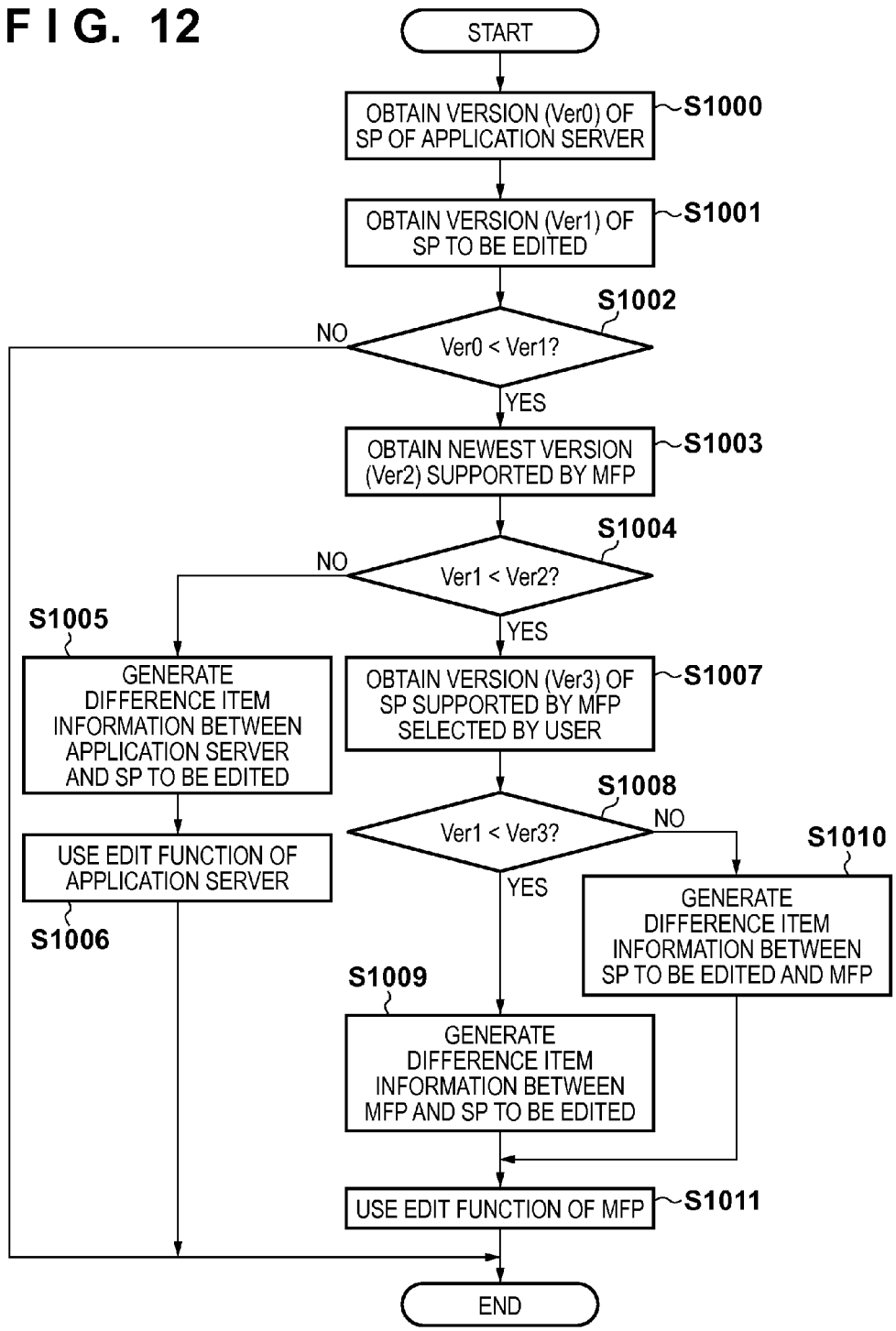
FIG. 12 is a diagram showing a process of generating difference information between versions.

FIG. 12 is a flowchart showing the process of generating the difference information displayed in the difference display area 911 in the "excluded items" screen 910, in the network device management application 202 in the application server 100. Each process shown in FIG. 12 is realized by, for example, the CPU 101 in the application server 100 reading the control program from the ROM 103 into the RAM 102 and executing the control program.

In step S1000, the CPU 101 obtains the SP version ("Ver0" in FIG. 12) supported by the application server 100, with reference to the SPVer 315 in the application server management table 300. The CPU 101 then proceeds to step S1001. In step S1001, the CPU 101 obtains the SP version ("Ver1" in FIG. 12) of the SP setting information selected by the user in step S500 in FIG. 5A, with reference to the SP management table 302. The CPU 101 then proceeds to step S1002.

In step S1002, the CPU 101 compares the version supported by the application server 100, which is obtained in step S1000, and the SP version of the SP setting information selected by the user, which is obtained in step S1001. The CPU 101 determines whether or not the SP version of the SP setting information selected by the user is newer than the version supported by the application server 100. In the case of determining that the version of the SP setting information selected by the user is newer than the version supported by the application server 100, the CPU 101 proceeds to step S1003. In the case of determining that the version of the SP setting information selected by the user is not newer than the version supported by the application server 100, the CPU 101 determines not to generate the difference information, and ends the process in FIG. 12. This is because the application server 100 has an SP edit configuration table for each older version of SP setting information and is capable of editing in each version, and so there is no particular need to generate the difference information for display.

In step S1003, the CPU 101 detects (specifies) the MFP 130 having the newest version from among the SP versions supported by the MFPs 130 managed by the application server 100 and obtains the version, with reference to the SPVer 327 in the network device management table 301. The CPU 101 then proceeds to step S1004. In FIG. 12, the newest version of the SP versions supported by the MFPs 130 managed by the application server 100 is denoted as "Ver2".

In step S1004, the CPU 101 compares the SP version of the SP setting information selected by the user, which is obtained in step S1001, and the newest SP version supported by the MFP 130, which is obtained in step S1003. The CPU 101 determines whether or not the newest SP version supported by the MFP 130 is newer than the SP version of the SP setting information selected by the user. In the case of determining that the newest SP version supported by the MFP 130 is newer than the SP version of the SP setting information selected by the user, the CPU 101 proceeds to step S1007. In the case of determining that the newest SP version supported by the MFP 130 is not newer than the SP version of the SP setting information selected by the user, the CPU 101 proceeds to step S1005.

In step S1005, the CPU 101 generates and displays the difference information, from the SP setting information selected by the user and the SP setting information of the SP version supported by the application server 100. The CPU 101 then proceeds to step S1006. In this embodiment, the SP setting information is expressed in XML, so that the CPU 101 can display data for tag information of data not supported by the application server 100 and the number of items through comparison of tag information.

In step S1006, the CPU 101 accepts the edit of the SP setting information by the user on the security policy setting screen 900, using only the edit function of the application server 100. After step S1006, the CPU 101 ends the process in FIG. 12. Step S1006 is performed after step S1005 and the SP version of the network device management application 202 in the application server 100 is updated with the SP version of the SP setting information to be edited by the user based on the difference information.

Thus, in this embodiment, the difference information is displayed as shown in FIGS. 11A and 11B in the case where the SP setting information selected by the user is newer than the SP version supported by the application server 100.

In step S1007, the CPU 101 obtains the SP version ("Ver3" in FIG. 12) supported by the MFP 130 selected by the user in the security policy edit device list 610, and proceeds to step S1008.

In step S1008, the CPU 101 compares the SP version of the SP setting information selected by the user, which is obtained in step S1001, and the SP version supported by the MFP 130 selected by the user, which is obtained in step S1007. The CPU 101 determines whether or not the SP version supported by the MFP 130 is newer than the SP version of the SP setting information selected by the user. In the case of determining that the SP version supported by the MFP 130 is newer than the SP version of the SP setting information selected by the user, the CPU 101 proceeds to step S1009. In the case of determining that the SP version supported by the MFP 130 is not newer than the SP version of the SP setting information selected by the user, the CPU 101 proceeds to step S1010.

In step S1009, the CPU 101 generates and displays the difference information that is included in the SP version supported by the MFP 130 selected by the user but not included in the SP setting information selected by the user, and proceeds to step S1011. In this embodiment, the SP setting information is expressed in XML, so that the CPU 101 generates the difference information through comparison of tag information.

In step S1010, the CPU 101 generates and displays the difference information that is included in the SP setting information selected by the user but not included in the SP setting information of the SP version supported by the MFP 130 selected by the user, and proceeds to step S1011. In this embodiment, the SP setting information is expressed in XML, so that the CPU 101 generates the difference information through comparison of tag information.

In step S1011, the CPU 101 displays the security policy setting screen 710 of the application server 100 with the SP edit function of the MFP 130 selected by the user being included in the inline frame, on the display 109. The display in step S1011 allows the user to edit the SP setting information. After step S1011, the CPU 101 ends the process in FIG. 12. In the case where step S1011 follows step S1010, step S1011 is performed after the SP version of the SP management module 231 supported by the MFP 130 is updated with the SP version of the SP setting information to be edited by the user based on the difference information.

Thus, in this embodiment, in the case where the SP version of the SP setting information to be edited by the user does not conform to the SP version supported by the application server 100 or the MFP 130, the difference information between the SP versions is displayed. This allows the user to easily recognize which items are different between the SP versions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-260665, filed Dec. 17, 2013, and Japanese Patent Application No. 2014-085887, filed Apr. 17, 2014, which are hereby incorporated by reference herein in their entirety.

What is claimed is:

1. An information processing apparatus capable of communicating with a network device, the information processing apparatus comprising:
    an acceptance unit configured to accept an edit of a file including a plurality of setting items;
    a determination unit configured to determine whether or not the information processing apparatus supports a version corresponding to the plurality of setting items included in the file, in response to the acceptance of the edit by the acceptance unit; and
    a display control unit configured to: in a case where the determination unit determines that the information processing apparatus supports the version corresponding to the plurality of setting items included in the file, display an edit screen of the file on a display unit of the information processing apparatus; and in a case where the determination unit determines that the information processing apparatus does not support the version corresponding to the plurality of setting items included in the file, display the edit screen of the file on the display unit of the information processing apparatus, using edit screen data for a display process by a network device that supports the version.

2. The information processing apparatus according to claim 1,
    wherein the display control unit is configured to, in a case where the determination unit determines that the information processing apparatus does not support the version corresponding to the plurality of setting items included in the file, display a selection screen of network devices that support the version.

3. The information processing apparatus according to claim 2,
    wherein the display control unit is configured to display a version supported by each network device in the selection screen.

4. The information processing apparatus according to claim 1, further comprising
    an obtainment unit configured to, in a case where the display control unit displays the edit screen of the file on the display unit of the information processing apparatus using the edit screen data for the display process by the network device that supports the version, obtain a pre-edit setting from the network device.

5. The information processing apparatus according to claim 4, further comprising:
    a device determination unit configured to determine whether or not the network device from which the obtainment unit obtains the pre-edit setting is a transmission destination of the file with the edited setting; and
    a transmission unit configured to, in a case where the device determination unit determines that the network device is not the transmission destination of the file with the edited setting, transmit the file with the pre-edit setting obtained by the obtainment unit to the network device, after the edit.

6. The information processing apparatus according to claim 5,
    wherein the transmission unit is configured to, in a case where the device determination unit determines that the network device is the transmission destination of the file with the edited setting, transmit the file with the edited setting to the network device.

7. The information processing apparatus according to claim 1,
    wherein the display control unit is configured to, in a case where the determination unit determines that the information processing apparatus does not support the version corresponding to the plurality of setting items included in the file, connect to a network device that supports the version, and remotely display the edit screen of the file on the display unit of the information processing apparatus using the edit screen data for the display process by the network device.

8. The information processing apparatus according to claim 1, further comprising:
    a detection unit configured to detect an apparatus included in a system managed by the information processing apparatus, wherein the apparatus supports a second version different from a first version corresponding to the plurality of setting items included in the file to be edited in response to the acceptance of the edit by the acceptance unit;
    a difference information obtainment unit configured to obtain difference information between the plurality of setting items included in the file to be edited and a plurality of setting items corresponding to the second version supported by the apparatus detected by the detection unit; and
    a display unit configured to display the difference information obtained by the difference information obtainment unit.

9. The information processing apparatus according to claim 8,
    wherein the second version is newer than the first version.

10. The information processing apparatus according to claim 8, further comprising:
   a second display unit configured to display a screen for accepting selection of a version of the edited file; and
   a storage unit configured to store the edited file, according to the version accepted on the screen displayed by the second display unit.

11. The information processing apparatus according to claim 8, further comprising
   a specifying unit configured to specify a network device that supports a newest version of versions supported by a plurality of network devices managed by the information processing apparatus,
   wherein the apparatus detected by the detection unit includes the network device specified by the specifying unit.

12. The information processing apparatus according to claim 8, further comprising
   a third display unit configured to display a screen for accepting selection of a network device from a plurality of network devices managed by the information processing apparatus,
   wherein the apparatus detected by the detection unit includes the network device selected on the screen displayed by the third display unit.

13. The information processing apparatus according to claim 8,
   wherein the detection unit is configured to detect the apparatus included in the system managed by the information processing apparatus, in a case where the first version is newer than a version supported by the information processing apparatus.

14. A control method executable in an information processing apparatus capable of communicating with a network device, the control method comprising:
   an acceptance step of accepting an edit of a file including a plurality of setting items;
   a determination step of determining whether or not the information processing apparatus supports a version corresponding to the plurality of setting items included in the file, in response to the acceptance of the edit in the acceptance step; and
   a display control step of: in a case of determining in the determination step that the information processing apparatus supports the version corresponding to the plurality of setting items included in the file, displaying an edit screen of the file on a display unit of the information processing apparatus; and in a case of determining in the determination step that the information processing apparatus does not support the version corresponding to the plurality of setting items included in the file, displaying the edit screen of the file on the display unit of the information processing apparatus, using edit screen data for a display process by a network device that supports the version.

15. A non-transitory computer-readable storage medium storing a program for causing a computer to execute:
   an acceptance step of accepting an edit of a file including a plurality of setting items;
   a determination step of determining whether or not an information processing apparatus supports a version corresponding to the plurality of setting items included in the file, in response to the acceptance of the edit in the acceptance step; and
   a display control step of: in a case of determining in the determination step that the information processing apparatus supports the version corresponding to the plurality of setting items included in the file, displaying an edit screen of the file on a display unit of the information processing apparatus; and in a case of determining in the determination step that the information processing apparatus does not support the version corresponding to the plurality of setting items included in the file, displaying the edit screen of the file on the display unit of the information processing apparatus, using edit screen data for a display process by a network device that supports the version.

* * * * *